Feb. 14, 1961     D. O. SPROULE     2,972,069
ULTRASONIC FLAW DETECTING APPARATUS
Filed March 3, 1958
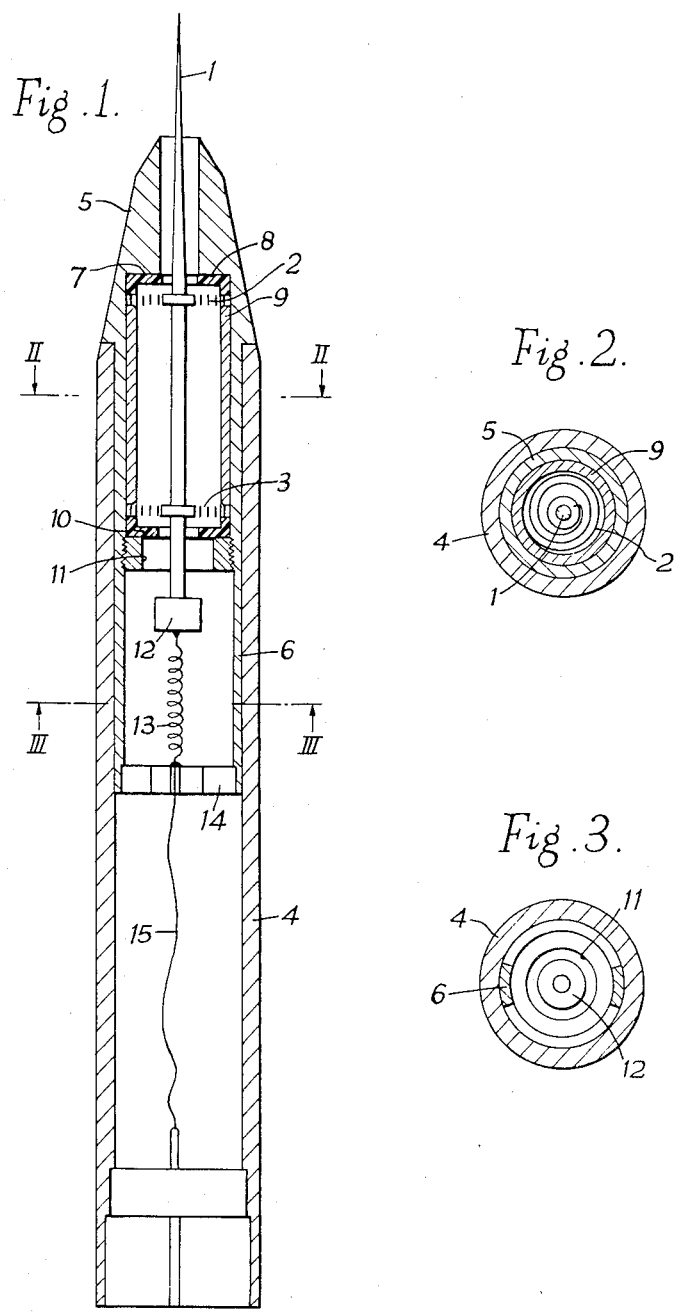
INVENTOR
DONALD ORR SPROULE
BY
*Irwin S. Thompson*
ATTORNEY United States Patent Office 2,972,069
Patented Feb. 14, 1961

2,972,069
ULTRASONIC FLAW DETECTING APPARATUS

Donald Orr Sproule, London, England, assignor of one-half to Glass Developments Limited, London, England, a company of Great Britain Filed Mar. 3, 1958, Ser. No. 718,793
2 Claims. (Cl. 310—8.3)

The present invention relates to electro-acoustic transducers such as are used, for instance, for the injection of vibrations, which may be of ultrasonic frequency, into a solid or the detection of such vibrations in the solid. One application of such devices is in connection with a known method of flaw detection in metallic objects by an echo technique in which case separate transducers for transmitting and receiving will generally be required. In the design of flaw detecting equipment it has now become usual to make use of a liquid couplant to ensure the necessary transfer of the vibrations from the transducer to the test object but this is not always desirable and it is an object of the present invention to provide a so-called probe which will give consistent results in the transfer of vibrations without the use of any liquid.

The general practice is to make use of a probe several wavelengths in diameter which produces a beam when used as a transmitter and directional selectivity when used as a receiver. This presents difficulties if the test object has an irregular surface and the need has therefore been felt for a point probe, which, however, will be substantially non-directional and will not be able to transfer nearly so much ultrasonic energy. It has generally been considered desirable that the diameter of the end of a point probe which makes contact with the test object should be less than a quarter of a wavelength if satisfactory operation is to be obtained. Even if this precaution is observed, however, the results obtained tend to be unexpectedly erratic so that the usefulness of the technique is somewhat impaired. The present invention is based on the appreciation of the fact that even normally smooth surfaces present considerable irregularities and that, as a consequence, contact between the object and the probe takes place at comparatively few points the disposition of which is very variable. The area of contact may be increased by increasing the pressure applied to the probe but a limit is set by the fact that a hard probe against a soft object will produce scratching if the pressure is unduly increased and this is generally considered undesirable.

According to the invention the probe is so arranged that the mechanical reactance of the small regions of contact is small in relation to the mechanical impedance of the electro-acoustic transducer as a whole which is virtually that of the rod carrying the transducer element. In practice this can most readily be achieved by arranging for the probe to have a rounded point of very small diameter considerably less than a quarter wave length. Thus it was found to be satisfactory to use a probe having a point with a diameter of .005" and tapering gradually to a diameter of .04" in a distance of one inch, the frequency of the waves employed being 2.5 mc./s. corresponding to a wavelength of approximately one-tenth of an inch in most metals.

The invention will be better understood from the following description of one method of carrying it into effect which should be taken in conjunction with the accompanying drawings, comprising Figures 1–3. In order to facilitate the showing, these are not strictly to scale. Figure 1 is a sectional side elevation of an improved point probe, Figure 2 is a transverse section along the line II—II and Figure 3 is a similar transverse section along the line III—III.

The probe itself comprises a rod 1 of suitable material for instance mild steel extending to a point with a diameter of approximately .005" and tapering gradually such that it has a diameter of .04" within a distance of about one inch. This is supported by two spiral or hair springs 2 and 3 which are clamped by their outer turns and have such mechanical characteristics in relation to the weight of the probe as to maintain it in a substantially central position when the whole instrument is held horizontally. The assembly is mounted in a main case 4 which is shaped and balanced so that it may comfortably be held in the hand for the purpose of making tests and this co-operates with a nose section 5 having an extended cylindrical portion of which the extremity 6 is open comprising a ring supported by two side members as shown more clearly from Figure 3. The nose portion 5 is provided with a shoulder 7 into which fits a stepped collar 8 of insulating material. The hair spring 2 is maintained in position against this collar 8 by a tube 9 with chamfered ends which may be of metal such as brass and also bears against the hair spring 3. This in turn is held by an insulating stepped collar 10 similar to the collar 8 and the whole assembly is maintained in position by the nut 11 which threads into the nose piece 5. An electro-acoustic transducer element 12, for instance a crystal of barium titanate, is secured to the end of the rod 1 and an electrical connection is made thereto by means of the spring 13 which has sufficient mechanical stiffness to control the longitudinal movement of the probe 1. This spring is fixed to a metallic insert 14 in a cap member 5 of insulating material supported in the ring at the end of the member 5 and a further wire 15 permits electrical connection to be made to the transducer by way of an external lead not shown.

The arrangement is preferably such that it is difficult to exert sufficient pressure on the point of the probe to produce scratching, though this may be possible with incautious use since the hubs of the hair springs are slightly larger than the central holes in the collars 8 and 10 and these set limits to the movement of the probe 1.

It will be understood that the preferred form of the improved probe has been described and this is found to give good results in practice. Other constructions are possible, however, for instance the probe itself might be supported by transverse wires from a system of comparatively rigid supports located in the form of a square or the place of the hair springs might be taken by resilient membranes, either of thin metal or of material such as rubber.

The arrangement illustrated however gives very consistent results in practice and these overcome one of the major difficulties which have been experienced hitherto with point probes operating without a liquid couplant. Clearly the exact relationship between the static forces and the optimum diameter of the point of the probe depends on the hardness of the rod, the hardness of the test object and the maximum indentation which can be tolerated as well as on the method of support of the probe.

In some cases it may be desirable to match the transducer to an absorber which will prevent reverberation in the transducer and/or coupling bar.

I claim:

1. An electro-acoustic transducer device for the injection of ultrasonic vibrations into a solid by contact therewith without damaging the surface thereof, comprising a rod tapering gradually to a rounded point, said point having a diameter appreciably less than a quarter of the wavelength of said vibrations in said solid, a casing surrounding and spaced from said rod, means supporting and permitting movement normal to the axis of said rod upon application of pressure thereto for preventing undue pressure from being placed on said rod, an electro-acoustic transducer element mounted on the end of said rod remote from said point, and a resilient conductor connecting said transducer element to said casing.

2. An electro-acoustic transducer device for the injection of ultrasonic vibrations into a solid by contact therewith without damaging the surface thereof, comprising a rod tapering gradually to a rounded point, said point having a diameter appreciably less than a quarter of the wavelength of said vibrations in said solid, a casing surrounding and spaced from said rod, means permitting movement normal to the axis of said rod upon application of pressure thereto for preventing undue pressure from being placed on said rod comprising a pair of spaced-apart spiral springs each having its outer end connected to said casing and its inner end connected to said rod, a crystal of barium titanate mounted on the end of said rod remote from said point and an electrically conducting helical spring connecting said crystal to said casing, said spring having sufficient mechanical strength to limit appreciably the longitudinal movement of said rod.

References Cited in the file of this patent

UNITED STATES PATENTS

| | | |
|---|---|---|
| 1,966,446 | Hayes | July 17, 1934 |
| 2,452,211 | Rosethal | Oct. 26, 1948 |
| 2,514,080 | Mason | July 4, 1950 |
| 2,573,168 | Mason et al. | Oct. 30, 1951 |
| 2,753,948 | Ongaro | July 10, 1956 |

FOREIGN PATENTS

| | | |
|---|---|---|
| 336,766 | Great Britain | Oct. 23, 1930 |
| 732,083 | Great Britain | June 15, 1955 |
| 899,643 | France | June 6, 1945 |